United States Patent
Smith

(10) Patent No.: US 6,584,514 B1
(45) Date of Patent: Jun. 24, 2003

(54) APPARATUS AND METHOD FOR ADDRESS MODIFICATION IN A DIRECT MEMORY ACCESS CONTROLLER

(75) Inventor: Patrick J. Smith, Houston, TX (US)

(73) Assignee: Texas Instruments Incorporated, Dallas, TX (US)

( * ) Notice: Subject to any disclaimer, the term of this patent is extended or adjusted under 35 U.S.C. 154(b) by 472 days.

(21) Appl. No.: 09/670,668

(22) Filed: Sep. 27, 2000

Related U.S. Application Data

(60) Provisional application No. 60/156,626, filed on Sep. 28, 1999.

(51) Int. Cl.[7] .................................................. G06F 13/28

(52) U.S. Cl. ........................... 710/26; 710/4; 711/211; 711/217; 711/218; 711/220; 712/35; 712/43

(58) Field of Search ...................... 710/22–26; 711/211, 711/217, 218, 220; 712/35, 43

(56) References Cited

U.S. PATENT DOCUMENTS

| | | | | |
|---|---|---|---|---|
| 5,099,417 A | * | 3/1992 | Magar et al. .................. | 710/27 |
| 5,608,889 A | * | 3/1997 | Werlinger et al. .......... | 711/217 |
| 5,787,497 A | * | 7/1998 | Tokura et al. ............... | 711/220 |
| 5,826,106 A | * | 10/1998 | Pang ............................ | 710/25 |
| 6,163,836 A | * | 12/2000 | Dowling ....................... | 712/37 |

* cited by examiner

*Primary Examiner*—Jeffrey Gaffin
*Assistant Examiner*—Eron Sorrell
(74) *Attorney, Agent, or Firm*—William W. Holloway; W. James Brady; Frederick J. Telecky, Jr.

(57) ABSTRACT

In a digital signal processing unit, addressing apparatus implements a multiplicity of addressing modes. The addressing modes include a circular buffer memory mode, a frame mode, and a sorting mode. To increase the speed of the address modification, the index, the index in the presence of a positive wrap-around, and the index in the presence of negative wrap-around are determined together. Other apparatus determines the addressing mode and provides control signals for the selection of the correct index. The correct index is combined with the base address to provide the next new address.

17 Claims, 4 Drawing Sheets

APPARATUS AND METHOD FOR ADDRESS MODIFICATION IN A DIRECT MEMORY ACCESS CONTROLLER

RELATED APPLICATIONS

This application claims the benefit of U.S. Provisional Application No. 60/156,626, filed Sep. 28, 1999.

U.S. patent application Ser. No. 09/670,663; APPARATUS AND METHOD FOR THE TRANSFER OF SIGNAL GROUPS BETWEEN DIGITAL SIGNAL PROCESSORS IN A DIGITAL SIGNAL PROCESSING UNIT; invented by Patrick J. Smith, Jason A Jones and Kevin A. McGonagle; filed on even date herewith; and assigned to the assignee of the present application: U.S. patent application Ser. No. 09/670,664: APPARATUS AND METHOD FOR ACTIVATION OF A DIGITAL SIGNAL PROCESSOR IN AN IDLE MODE FOR INTERPROCESSOR TRANSFER OF SIGNAL GROUPS IN A DIGITAL SIGNAL PROCESSING UNIT; invented by Patrick J. Smith, Jason A. Jones, and Kevin A. McGonagle; filed on even date herewith; and assigned to the assignee of the present application: U.S. patent application Ser. No. 09/670,665; APPARATUS AND METHOD FOR A HOST PROCESSOR INTERFACE UNIT IN A DIGITAL SIGNAL PROCESSING UNIT; invented by Patrick J. Smith, and Jason A. Jones; filed on even date herewith; and assigned to the assignee of the present invention. U.S. patent application Ser. No. 09/670,666; APPARATUS AND METHOD FOR THE EXCHANGE OF SIGNAL GROUPS BETWEEN A PLURALITY COMPONENTS AND A DIRECT MEMORY ACCESS CONTROLLER IN A DIGITAL SIGNAL PROCESSOR; invented by Patrick J. Smith, Jason A. Jones, Kevin A. McGonagle, and Tai H. Nguyen; filed on even date herewith; and assigned to the assignee of the present application: and U.S. patent application Ser. No. 09/670,667; APPARATUS AND METHOD FOR A SORTING MODE IN A DIRECT MEMORY ACCESS CONTROLLER OF A DIGITAL SIGNAL PROCESSOR; invented by Patrick J. Smith and Tai H. Nguyen; filed on even date herewith; and assigned to the assignee of the present application.

BACKGROUND OF THE INVENTION

1. Field of the Invention

This invention relates generally to the data processing apparatus and, more particularly, to the specialized high performance processor units generally referred to as digital signal processing units. The invention relates specifically to address modification by the direct memory access controller.

2. Background of the Invention

Digital signal processing units have been developed as specialized data processing units. These units are optimized to perform routine, albeit complex, operations with great efficiency. For many applications, the computations need to done in as close to real time as possible. In addition, many of the functions that would be performed by the central processing unit of a general purpose processing unit are eliminated or the functions performed outside of the core processing unit.

Referring to FIG. 1, a digital signal processing unit 1 having two digital signal processors, according to the prior art, is shown. A first digital signal processor 10 includes a core processing unit 12 (frequently referred to as a processing core), a direct memory access unit 14, a memory unit or memory units 16, and a serial port or serial ports 18. The memory unit 16 stores the signal groups that are to be processed or that assist in the processing of the signal groups by the core processing unit 12. The core processing unit 12 performs the bulk of the processing of signal groups in the memory unit. The direct memory access unit 14 is coupled to the core processing unit 12 and to memory unit 16 and mediates the signal group exchange therebetween. The serial port 18 exchanges signal groups with processing components external to the digital signal processing unit 1. The core processing unit 12 is coupled to the serial port 18 and to the memory unit 16 and controls the exchange of signal groups between these components.

The digital signal processor is typically designed and implemented to have limited functionality, but functions that must be repeated and performed rapidly. The fast Fourier transform (FFT) calculation and the Viterbi algorithm decoding are two examples where digital signal processors have been utilized with great advantage. To insure that the digital signal processors operate with high efficiency, the core processing is generally optimized for the performance of the limited functionality. Part of the optimization process involves the off-loading, to the extent possible, any processing not directed toward the optimized function(s). The exchange of signal groups involving the core processing unit 12 and the memory unit 16 has been assigned to the direct memory access unit.

More recently, the direct memory access controller has been implemented to control the exchange of data groups between the serial port and the memory unit. This embodiment of a digital signal processor is described in the Patent Application entitled APPARATUS AND METHOD FOR THE EXCHANGE OF SIGNAL GROUPS BETWEEN A PLURALITY COMPONENTS AND A DIRECT MEMORY ACCESS CONTROLLER IN A DIGITAL SIGNAL PROCESSSOR cited above. Referring to FIG. 2, the digital signal processor 10, have a core processing unit 12, a direct memory access controller, a memory unit 16, and a serial port 18, the same components as in the prior art digital signal processors shown in FIG. 1. The difference between the embodiments in FIG. 1 and FIG. 2 is as follows. In FIG. 1, the direct memory access controller 14, control the exchange of signal groups between the memory unit 16, and the core processing unit 12. In FIG. 2, the direct memory access controller 24 controls not only the exchange of signal groups between the memory unit 16, and the core processing unit 12, but also controls the exchange of signal groups between the memory unit 16 and the serial port 18. With this implementation, the core processing unit 12 is relieved of further processing responsibilities, as compared to the implementation shown in FIG. 1 For example, the memory unit 16 to serial port 18 exchange of data signals can have a variety of addressing modes such as a frame mode, a circular buffer memory mode and a sorting mode. The core processing unit 12 is relieved of the responsibility for implementing the addressing modes. Thus, the core processing unit 12 can be further optimized for specific processing operations. The direct memory access controller can be analogized to a plurality of controllable switches. The switches provide controllable channels for the transfer of signals between components. (In the preferred embodiment of the digital signal processors, typically two memory units and two serial ports are present. Consequently, a larger number of channels can be used. In the preferred embodiment, six channels are available in the direct memory access controller 24.)

As the direct memory access controller 24 has been assigned greater responsibilities in the controlling the transfer of signal groups, the computational requirements for the component have been similarly expanded. In particular, not only is the generation of source and destination addresses required, but the several addressing conventions, mentioned above, must implemented by the direct memory access controller 24. Specifically, the addressing apparatus must be able to implement both a frame mode and a circular buffer mode. (In the circular buffer mode, a group of consecutive locations in the memory unit 16 are designated as the circular buffer memory and signal groups are stored therein or extracted therefrom. After the last location in the circular buffer memory is addressed, the addresses are "wrapped around" to the beginning of the buffer memory. The wrap-around of the addresses in the circular buffer can be positive or negative.) In addition, the addressing apparatus must be capable of operating in a sorting mode. The sorting mode refers to the time-division multiplexed groups of signal groups such as the T1 protocol (U.S.) or the E1 protocol (Europe). In this addressing mode, the signal groups from a multiplicity of blocks of signal groups are "sorted" into frames of signal groups, i.e., each frame including related signal groups. In addition, because performance is key in digital signal processors, the new address must be formulated rapidly.

A need has therefore been felt for apparatus and an associated method for modifying/generating an address in a direct memory access controller having the feature that a multiplicity of address modes can be accommodated by the apparatus and associated method. It would be a further feature of the present invention that the modification or creation of the address would take place in a time period that would not impact the performance of the digital signal processing system. It would be a more specific feature of the apparatus and method that a sorting mode would be provided for the time-division multiplexed signal groups. It is a further specific feature of the present invention to provide for the address modification or generation involving a circular address buffer.

SUMMARY OF THE INVENTION

The aforementioned and other features are accomplished, according to the present invention, by providing an address modification apparatus that can process a multiplicity of addressing modes using the same apparatus. The apparatus determines the proper addressing mode while simultaneously selecting a offset that will be involved in determining the new address from a former address or a base address. The address base and previous index are determined. A plurality of simultaneous calculations are performed that include possible circular buffer memory address results. The correct new index is selected from the determination of the addressing mode and characteristics of the previous address. The new index is combined with the base address to form the new address. The new address is forwarded to the addressing apparatus and is used to determine the next address. To increase the speed, the results of one computation are immediately coupled to apparatus performing a subsequent computation.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT

1. Detailed Description of the Figures

Figure 1:
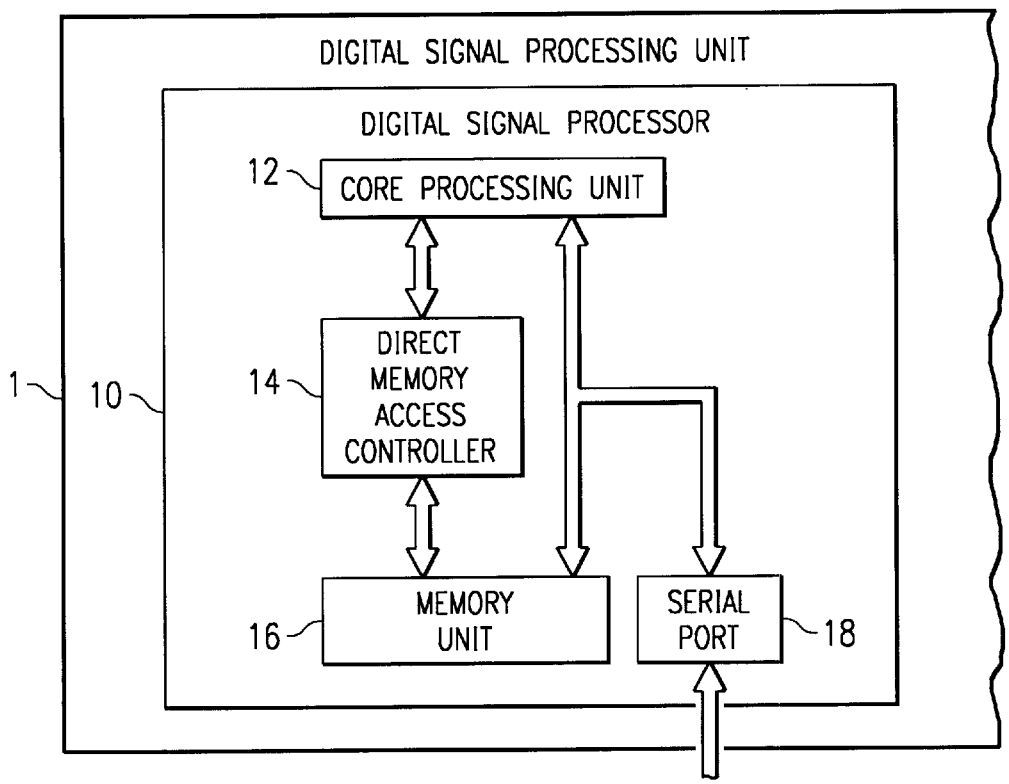
FIG. 1 is a block diagram of a digital signal processing unit having two digital signal processors according to the prior art.
Figure 2:
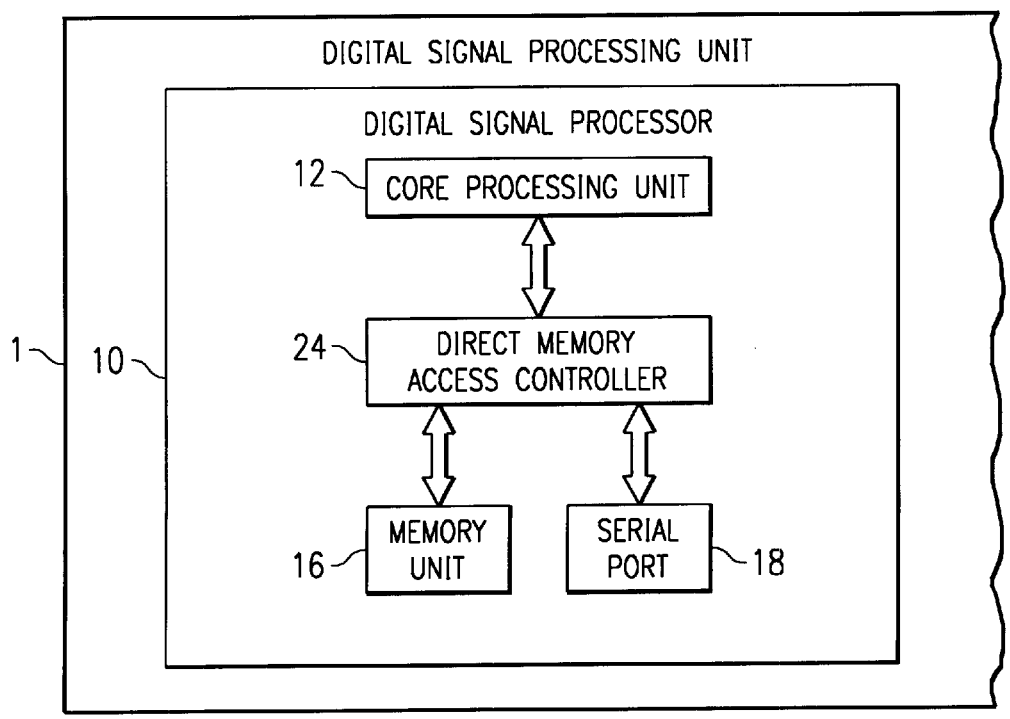
FIG. 2 is a block diagram of a more recent embodiment of a digital signal processing unit.

FIG. 1 and FIG. 2 have been discussed with respect to the to the background of the invention.

Figure 3:
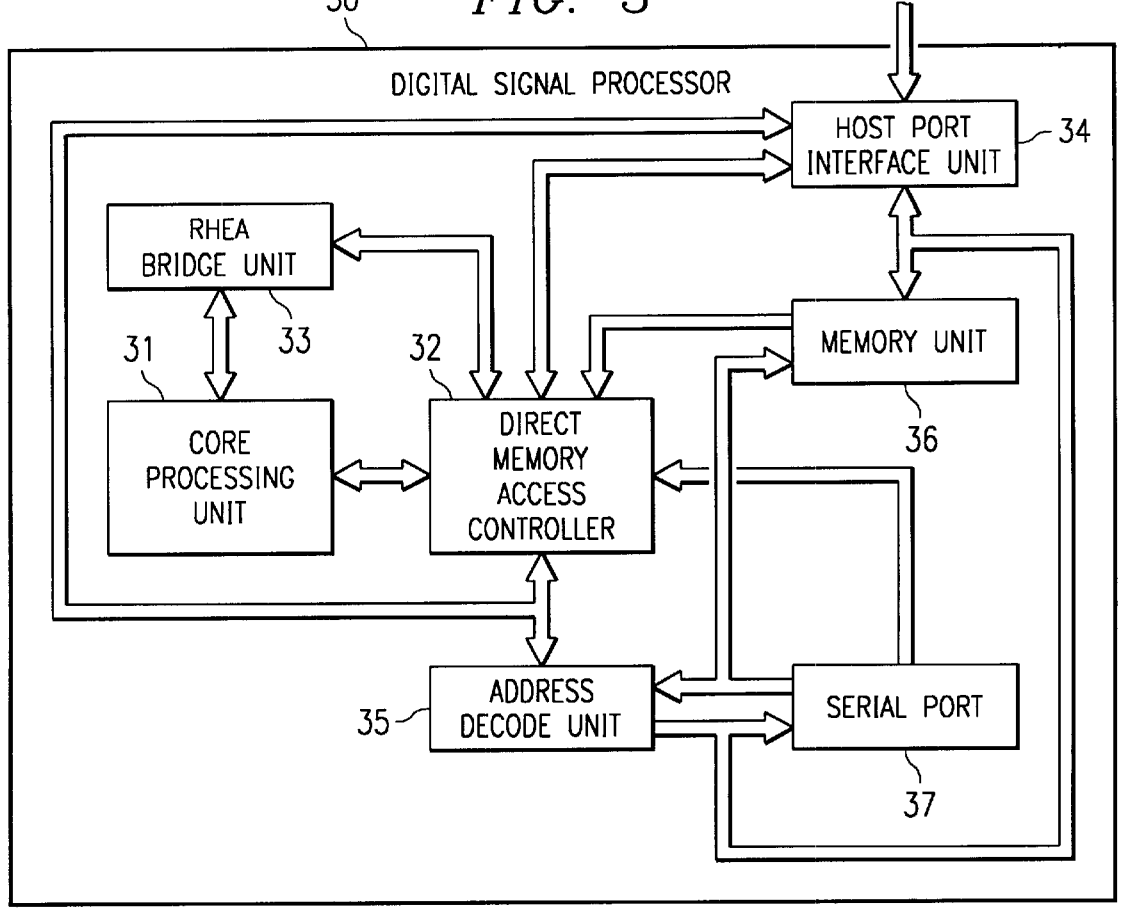
FIG. 3 is a block diagram of a preferred embodiment of a digital signal processor capable of utilizing the present invention.

Referring next to FIG. 3, a block diagram of a digital signal processor 30, according to the preferred embodiment of the invention, is shown. The core processing unit 31 performs the principal processing functions of digital signal processor 30. The core processing unit 31 is generally optimized in both hardware and in software to perform a limited number of processing functions extremely efficiently. The memory unit 36 stores the signal groups that the core processing unit requires for the processing functions. The serial port 37 exchanges signal groups with components outside of the digital signal processing unit. The rhea bridge unit 33 provides an interface between a memory-mapped register bank in the core processing unit 31 and control (context) registers in the direct memory access controller 32. An address decode unit 35 provides an interface with the memory unit 36 and the serial port 37. The host processor interface unit 34 provides an interface to the memory unit 36 and the serial port 37. The direct memory access controller 32 has an interface with the core processing unit 31, the rhea bridge unit 33, host interface unit 34, the address decode unit, the memory unit 36 and the serial port 37. In addition, the direct memory access control 32 can receive test signals and interrupt signals. The direct memory access controller 32 performs the functions of controlling the exchange of signal groups between the core processing unit 31 and the memory unit 36. In addition, the direct memory access controller 32 controls the exchange of signal groups between the serial port 37 and the memory unit 36. In controlling these signal group exchanges, the core processing unit 31 is relieved of these processing functions and can therefore perform the functions for which the core processing unit 31 was optimized more efficiently.

Figure 4:
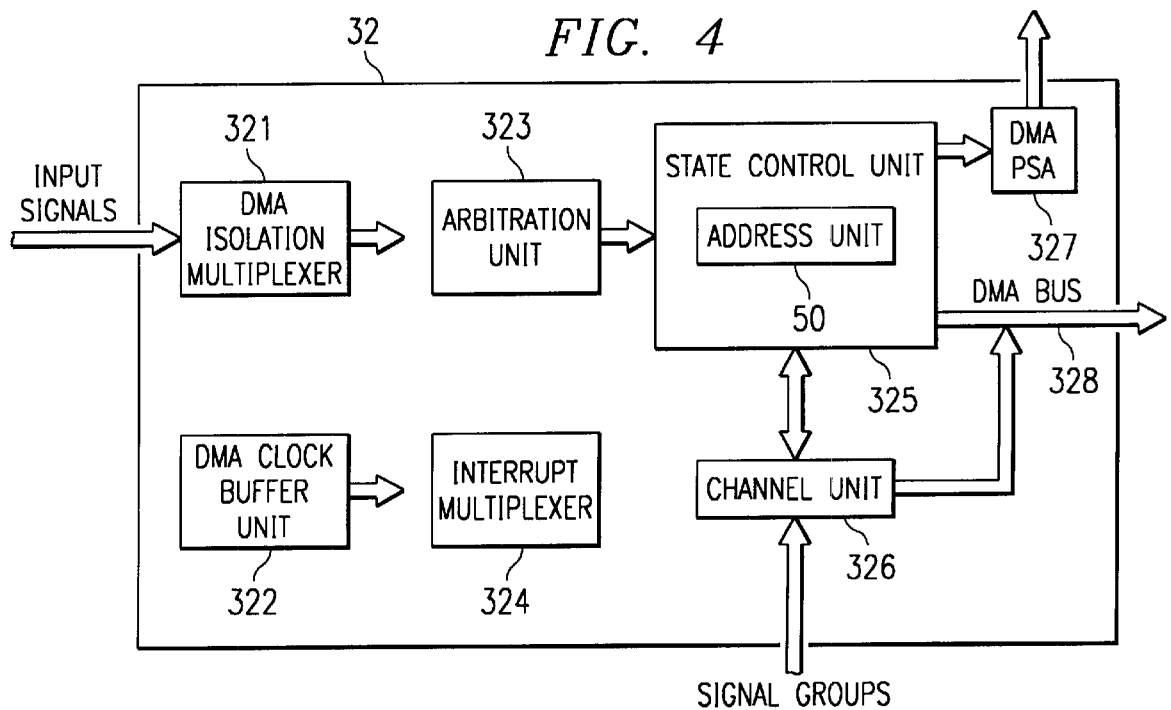
FIG. 4 is a block diagram of a direct memory access controller capable of advantageously using the present invention.

Referring to FIG. 4, a block diagram of the principal components of a direct memory access controller 32, according to the preferred embodiment of the present invention, is shown. The direct memory access controller includes dma isolation multiplexer 321, a clock buffer unit 322, an arbitration unit 323, an interrupt multiplex unit 324, a state control unit 325, a channel unit 326, a PSA unit 326 and a dma bus 328. The dma isolation multiplexer 321 includes the logic components to isolate the input signals to the direct memory access controller 32 for testing. The clock buffer unit 322 contains logic to correct for the skew of the external (i.e. to the digital signal processor) clock signal. The clock signal is then distributed throughout the direct memory access unit 32. The interrupt multiplexer unit 324 provides synchronous interrupts to the core processing unit of the digital signal processor. The arbitration logic 323 includes apparatus responsive to bids for control of one of the channels to select a user of the channel unit 326 and the dma bus 328. The PSA unit 326 is a calculator for testing and for debugging the direct memory access controller 32. The state control unit 325 selects the state (configuration) of the direct memory access controller and applies the control signals that implement the machine configuration. The state control unit 325 includes address unit 50 that will be discussed below. The dma bus 328 includes the signal groups, control signal groups and address signal groups determined by the state control unit 325.

Figure 5:
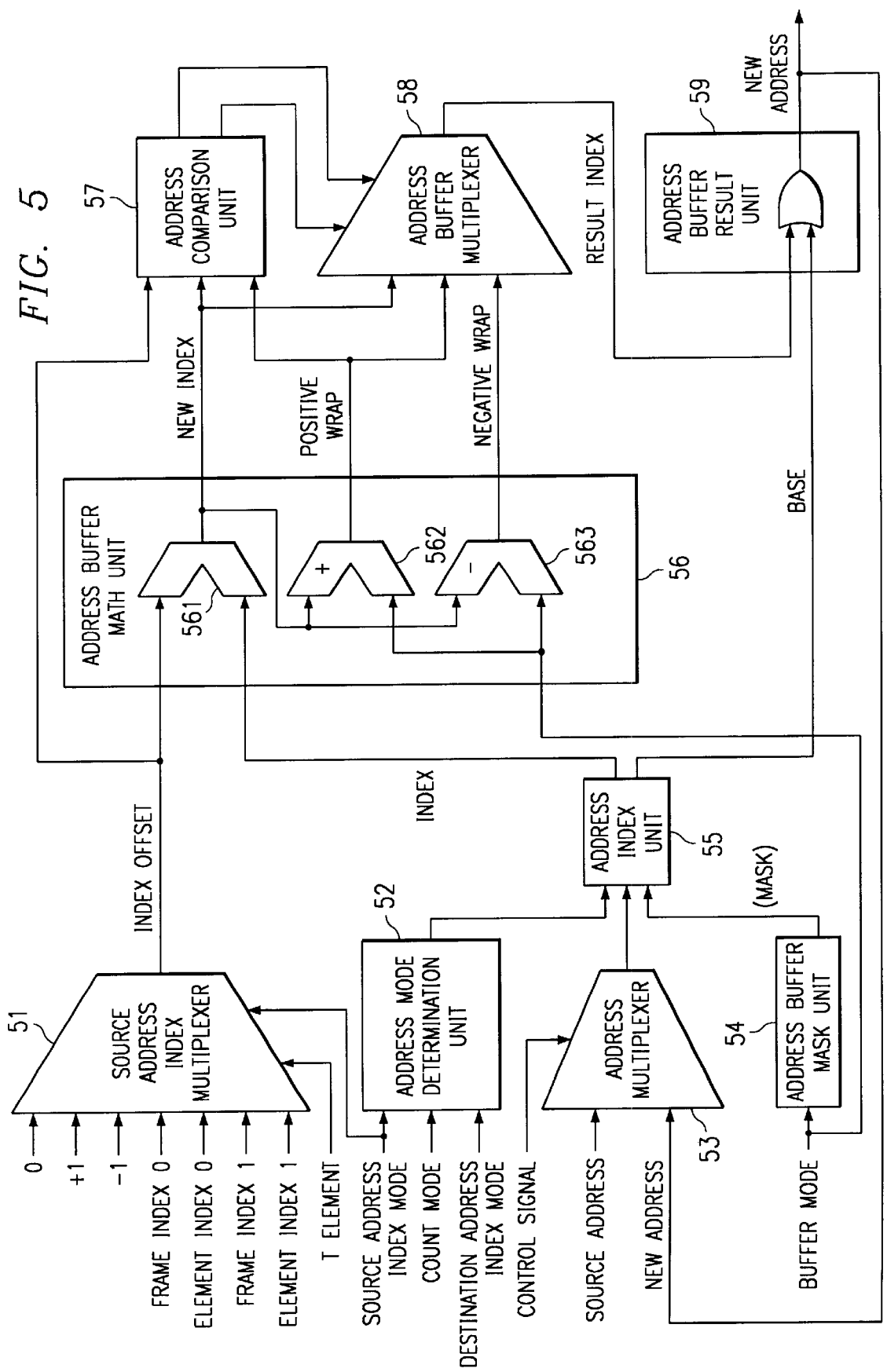
FIG. 5 is a block diagram of the address modification apparatus for use with the direct memory access controller according to the present invention.

Referring to FIG. 5, a block diagram of the address modification apparatus 50, according to the present invention, is shown. Source address index multiplexer 51 has applied to input terminals thereof a 0 logic signal, a +1 logic signal, a −1 logic signal, a frame index 0 signal group, an element index 0 signal group, a frame index 1 signal group, and an element index 1 signal group. The frame index and element index signal groups can be signed values, are required by the sorting mode, and will be described in more detail below. The quantities applied to source address index multiplexer 51 can be thought of as address index modifiers or address offsets. After an access of the direct memory access controller, the new address will be read from the address buffer result unit 59. A SOURCE_ADDRESS_INDEX_MODE control signal and a TELEMENT control signal are applied to the control terminals of the source address index multiplexer 51. The TELEMNET signal indicates that the present element is the last element of series of elements. Based on the control signals applied to the source address index multiplexer 51, one of the signal groups applied to the input terminals is applied the output terminal and become the INDEX_OFFSET signal.

The address mode determination unit 52 has the SOURCE_ADDRESS_INDEX_MODE control signal, the COUNT_MODE control signal, and the DESTINATION_ADDRESS_INDEX_MODE control signal applied to input terminals thereof. These control signals together provide the information as to whether the current addressing mode is a frame mode or a circular buffer mode.

The address multiplexer 53 has the SOURCE_ADRESS address signal group applied to a first input terminal and a NEW_ADDRESS signal group applied to a second input terminal. A control signal is applied to the control terminal of the address multiplexer unit 53. The control signal essentially indicates whether this is the first address to be generated in a sequence. A BUFFER_SIZE signal group is applied to the address buffer mask unit 54. The address buffer mask unit 54 generates a mask based on the size of the buffer.

The output signals of the address mode determination unit 52, the address multiplexer 53 and the address buffer mask unit 54 are applied to the address index unit 55. The address index unit 55 generates an INDEX signal group and a BASE signal group.

The address buffer math unit 56 includes a first adder unit 561, a second adder unit 562, and a third adder unit 563. The output terminal of source address index multiplexer 51, the INDEX_OFFSET signal, is applied to a first input terminal of first adder 561. The second terminal of first adder 561 has the INDEX signal from an output terminal of address index unit 55 applied thereto. The output signal from the first adder unit 561, i.e., a NEW_INDEX signal, is applied to a first input terminal of the second adder unit 562 and to a first input terminal of the third adder unit 563. The ELEMENT_COUNT signal group is applied to a second input terminal of the second adder unit 562 and to a second input terminal of the third adder unit 563. The second adder unit 562 calculates the POSITIVE_WRAP signal that includes the NEW_INDEX value, while the third adder unit 563 calculates the NEGATIVE_WRAP signal that includes the NEW_INDEX value.

The address comparison unit 57 has the INDEX_OFFSET signal from the source address index multiplexer 51, the NEW_INDEX signal from the first adder unit 561, and the POSITIVE_WRAP signal group from the second address unit 562 applied thereto. The address calculation unit 57 generates two control signals and applies these signals to control terminals of a address buffer multiplexer unit 58. These two control signals determine whether the boundaries of the address buffer have been exceeded, and if exceeded, is the buffer wrap positive or negative. The input terminals of the address buffer multiplexer 58 receives a NEW_INDEX signal group from the first adder unit 561, a POSITIVE_WRAP signal from the second adder unit 561, and a NEGATIVE_WRAP signal group from the third adder unit 563. The output signal from the address buffer multiplexer 58 is applied to a first input terminal of address buffer result unit 59, while a second input terminal of the address buffer result unit 59 receives a BASE output signal group from the address index unit 55. The output signal of the address buffer unit 59 is the NEW_ADDRESS signal group.

Figure 6:
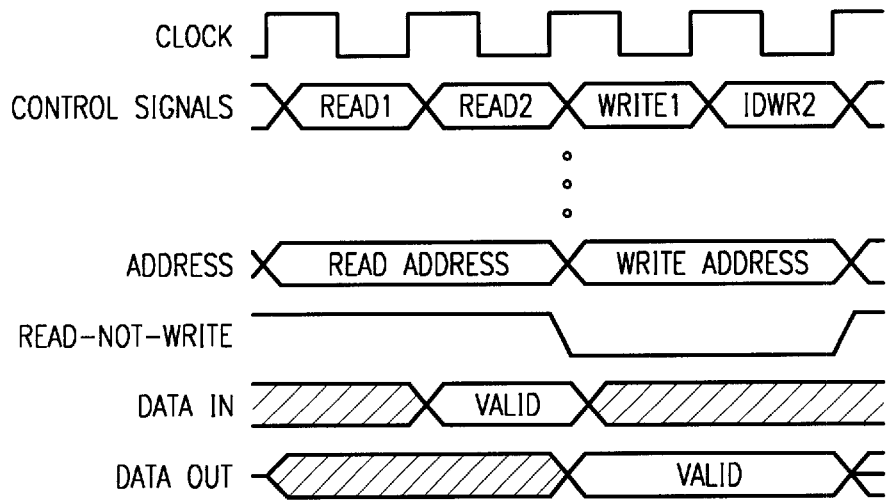
FIG. 6 is a timing diagram illustrating the relationship of the address modification apparatus to the movement of data in the direct memory access unit according to the present invention.

Referring next to FIG. 6, a timing chart is shown illustrating the relationship of the address modification apparatus and the clock. The CLOCK signal provides the reference for the other signal. The control signals indicated when a read procedure and a write procedure. The address signal indicates when the read address is being generated and when the write address is being generated. The READ_NOT_WRITE signal is a control signal insuring that the appropriate operation is being performed. The DATA IN signal indicates when the signal group from a read address is stored in a channel register. The DATA_OUT signal indicates when the signal group is stored in the destination address. Both the read (source) address formation and the write (destination) address formation occur in two clock cycles.

Figure 7:
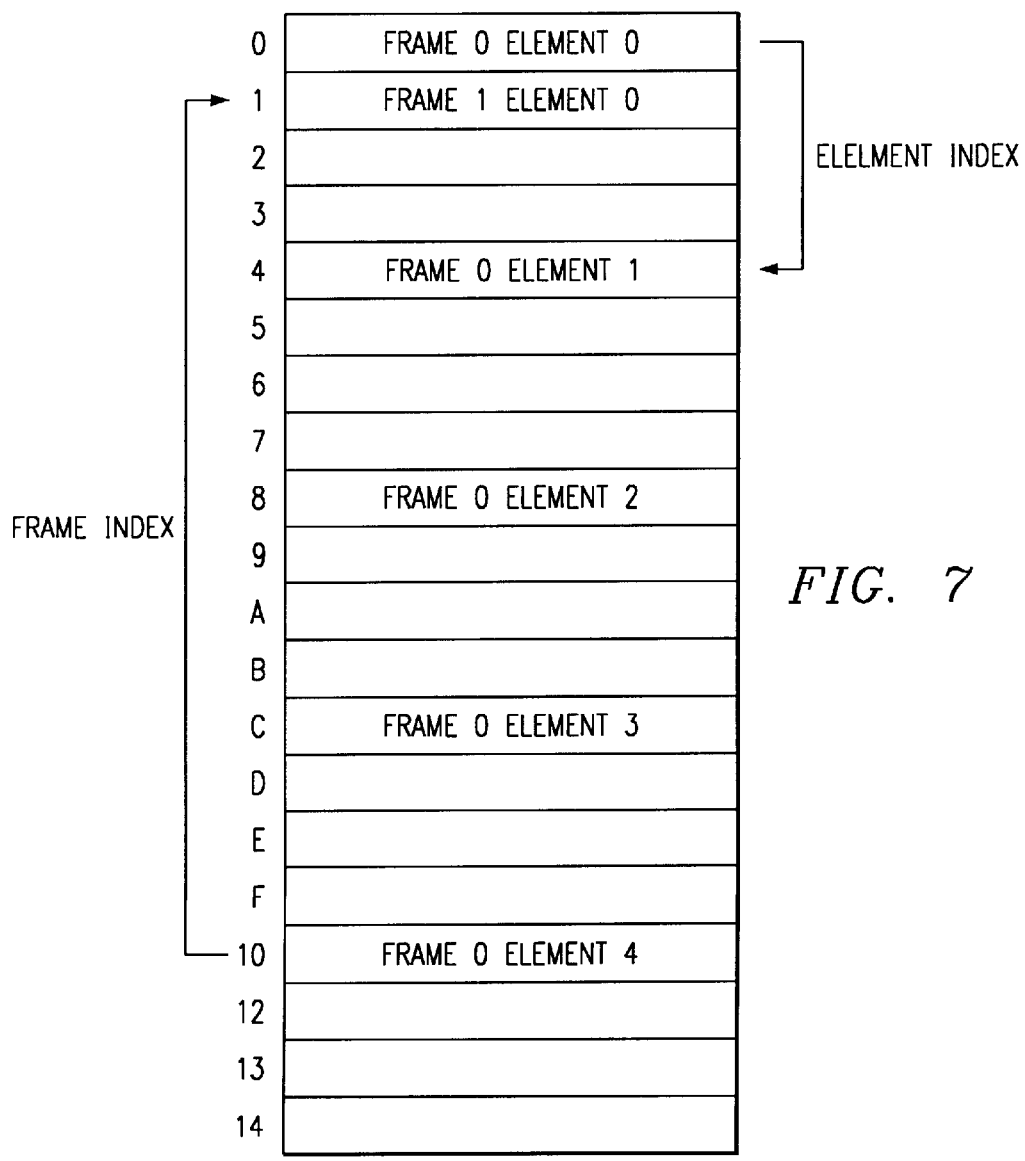
FIG. 7 is an illustration of a time-division multiplexed format illustrating the element index and the frame index.

Transmission of signal groups between a digital signal processing unit and a external frequently takes the form of a time-division multiplexed series of signal groups. Two methods of signal groups transmission that are common are referred to as a T1 protocol (U.S.) having 24 elements per frame and an E1 protocol (Europe) having 32 elements per frame. Referring to FIG. 7, an illustration of the organization of the E1 protocol is illustrated. As indicated in FIG. 7, the data is transmitted in blocks of signal groups (i.e., four elements per block is shown). The blocks of signal groups have the same number of signal groups as a frame of signal groups, but the organization is different. The first block includes, for example, the elements at the same location from each frame. The first block of elements include, in the U.S. protocol, element 0 from each frame. In other words, the first (0) block of transmitted signals groups is: frame 0, element 0; frame 1, element 0, through frame 23, element 0. The next block (1) of transmitted signal groups includes frame 0, element 1; frame 1, element 1; frame 2, element 1:

through frame 23, element 1. The last block (23) of transmitted signal groups is: frame 0, element 23; frame 1, element 23; through frame 23, element 23. FIG. 7 illustrates the definition of "element index" and "frame index" as used in the sorting mode. The element index identifies the next signal group in the same frame, while the frame index identifies, starting from the last signal group in a frame, the location of the first signal group in the next frame.

2. Operation of the Preferred Embodiments

The direct memory access controller can be thought of as a programmable, multi-channel switch for directing and controlling signal groups among the various components of the digital signal processor. By providing this functionality in the direct memory access controller, the core processing unit is left free to perform processing function for which it was optimized.

The operation of the present invention can be understood as follows. The apparatus has to accommodate two principal modes of operation, a frame mode and a address buffer unit mode. In addition, the apparatus has to be able to generate addresses in a sorting mode. The address protocol provides certain simplifications. For example, the base address is on a binary boundary. Thus, the series of binary bits that identify the base address are more significant bits than the series of binary numbers identifying the index address. And the bits identifying the base address and the index address do not overlap. Therefore, in the address buffer result unit the index value and the base value can be combined in an logic OR unit since the bit positions of the logic bits representing the index portion and the base address portion do not overlap. The address modification is complicated by the presence of both the circular buffer mode, the frame mode, and the sorting mode.

Referring again to FIG. 5, all of the possible index offset quantities are applied to the source address index multiplexer 51. The control signals determine which index offset is appropriate for the current addressing activity. Simultaneously, control signals applied to the address mode determination unit 52 result in an identification of the current active mode. The result of this identification is applied to the address index unit 55. Also applied to the address index unit is the result of a selection between the source address and the previously determined new address from the address multiplexer 53. Finally, applied to the address index unit 55 is a mask determined by the buffer size in the address buffer mask unit 54. Based on the input signals and the address format, the address input unit 55 determines the (previous) index address and the base address. The (previous) index and the index offset are added together in adder 561 to provide the new index. However, the possibility is present that the index, when combined with the base address will fall outside of the addresses of the circular buffer memory and will have to be wrapped positively or negatively to reenter the circular buffer memory. To provide for that circumstance, the new index applied to the adders 562 and 563. Adders 562 and 563 also receive a buffer size signal. The index value and the buffer size are combined in adders 562 and 563 to have available, if needed, the positive wrap address and the negative wrap address in the circular buffer memory. The new index address, the negative wrap address, and the positive wrap address are applied to input terminals of address multiplexer 58. The output signal group of the address buffer multiplexer 58 is determined by control signal from the address comparison unit 57. The address comparison unit 57 receives the index offset signal group from source address multiplexer 51, the new index signal group from adder 561, and the positive wrap signal from adder 562. Based on these input signals, the address comparison unit 57 applies control signals to the address buffer multiplexer 58 that determine which of the three signals applied to the address buffer multiplexer 58 is the appropriate (result) index signal. The appropriate (result) index signal is applied to the address buffer result unit where this signal group is combined with the base address to provide the new address signal. The new address signal provides the address for accessing the requisite signal group. The new address is also applied to one of the input terminals of address multiplexer 53.

As will be clear, one of the techniques for increasing the speed of the address modification is the calculation of the three possible addresses and the selection of the correct address after the calculations are complete. In addition, the result from adder 561 is applied to input terminals of adder 562 and adder 563 as the result is being formed. Thus, the calculation of the positive wrap and negative wrap are generated with a minimum of delay.

In the preferred embodiment, the new source address is calculated using a first address modification device as shown in FIG. 5, while the new destination address is calculates by a second address modification unit as shown in FIG. 5. This duplication of the address modification units is implemented for purposes of processing performance by the digital signal processing unit.

While the invention has been described with respect to the embodiments set forth above, the invention is not necessarily limited to these embodiments. Accordingly, other embodiments, variations, and improvements not described herein are not necessarily excluded from the scope of the invention, the scope of the invention being defined by the following claims.

What is claimed is:

1. A digital signal processing unit comprising:
   a core processing unit, the core processing unit processing signal groups;
   at least one memory unit, the memory unit storing signal groups processed and to be processed by the memory unit;
   at least one serial port, the serial port exchanging signal groups between the signal processing unit and apparatus external to the digital signal processing unit; and
   a direct memory access controller, the direct memory access controller controlling the transfer of signal groups between the core processing unit, the memory unit and the serial port, the direct memory access controller including an address unit, the address unit including:
      a first multiplexer unit responsive to control signals for selecting one of a plurality of offset signal in response to control signals;
      an index unit responsive to mode determination control signals and to address signals for determining a base address and a previous address index;
      an adder unit for combining the output signal from multiplex unit and the address index to provide a new address index;
      a first and a second adder unit responsive to the output signal of the adder unit and a buffer size for determining a positive wrap signal and a negative wrap signal;
      second multiplexer having the output signals from the adder unit, the first adder unit and the second adder unit applied to input terminals thereof, the second multiplexer selecting an address index; and
      a combining unit for combining the address index and the base address to form a new address signal group.

2. The digital signal processing unit as recited in claim 1 wherein the new address signal group is applied to the index unit.

3. The digital signal processing unit as recited in claim 1 wherein the signals applied to the first multiplexer include signals for incrementing and signals for decrementing the index address.

4. The digital signal processing unit as recited in claim 1 wherein the signals applied to the first multiplexer unit include frame index and element index signals used in the sorting mode.

5. The digital signal processing unit as recited in claim 1 wherein the address signal groups are contained within binary boundaries.

6. The digital signal processing unit as recited in claim 1 wherein the address unit can generate addresses in the frame addressing mode and in the circular buffer memory addressing mode.

7. The digital signal processing unit as recited in claim 1 wherein the index unit includes a mode determination unit for determining the addressing mode.

8. The method for providing a modified address in a digital signal processing unit, the method comprising:

determining a base address;

determining an addressing mode;

determining a first modified index value;

determining a second modified index value, the second modified index value being the first modified index value plus a positive wrap-around value;

determining a third modified index value, the third modified index value being the first modified index value plus a negative wrap around value;

selecting one of the first, second, and third modified index values to be the new modified index value; and combining the new modified index value and the base address to form a new modified address.

9. The method as recited in claim 8 wherein the addressing mode include a circular buffer mode, a frame mode, and a sorting mode.

10. The method as recited in claim 8 wherein an element index value or a frame index value is combined with the index to form a new index value in the sorting mode.

11. The method as recited in claim 8 wherein the base address is on a binary boundary.

12. An address apparatus for address modification in a circular buffer mode, a frame mode and a sorting mode, the address apparatus comprising:

index increment selection apparatus for selecting a index increment;

an index unit for determining a base address value and an index value;

a adder unit having a plurality of adders, the adder unit generating a modified index value, a positive wrap index value and a negative wrap index value;

a modified index selection apparatus for selecting a one of the modified index value, the positive wrap index value, and the negative index value; and a combining unit for combining the selected modified index and the base address value to provide the modified address.

13. The address apparatus as recited in claim 12 further comprising an address comparison unit, the address comparison unit applying control signals to the modified index selection apparatus for determining which index value is selected.

14. The address apparatus as recited in claim 13, wherein the address comparison unit has the index increment, the modified index value, and the positive wrap signals applied thereto.

15. The address apparatus as recited in claim 10 wherein the index unit has address mode determining control signals, the most recent modified address, and the buffer size applied thereto.

16. The address apparatus as recited in claim 10 wherein the base address is a binary boundary.

17. The address apparatus as recited in claim 10 wherein the index increment selection apparatus receives at least one mode determining control signal for determining the selected index increment.

* * * * *